(12) United States Patent
Springer

(10) Patent No.: US 10,984,261 B2
(45) Date of Patent: *Apr. 20, 2021

(54) SYSTEMS AND METHODS FOR CURB DETECTION AND PEDESTRIAN HAZARD ASSESSMENT

(71) Applicant: MOBILEYE VISION TECHNOLOGIES LTD., Jerusalem (IL)

(72) Inventor: Ofer Springer, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,935

(22) Filed: May 29, 2020

(65) Prior Publication Data

US 2020/0320315 A1 Oct. 8, 2020

Related U.S. Application Data

(63) Continuation of application No. 16/395,205, filed on Apr. 25, 2019, now Pat. No. 10,685,246, which is a
(Continued)

(51) Int. Cl.
*G06K 9/00* (2006.01)
*G06K 9/46* (2006.01)
(Continued)

(52) U.S. Cl.
CPC ......... *G06K 9/00805* (2013.01); *B60W 30/09* (2013.01); *B60W 50/14* (2013.01);
(Continued)

(58) Field of Classification Search
CPC .......... G06K 9/00805; G06K 9/00798; G06K 9/6267; G06K 9/4604; B60W 50/14;
(Continued)

(56) References Cited

U.S. PATENT DOCUMENTS

2006/0217886 A1 9/2006 Fujimoto
2007/0222857 A1 9/2007 Takeda et al.
(Continued)

FOREIGN PATENT DOCUMENTS

CN 102096803 A 6/2011
CN 103714538 A 9/2014

OTHER PUBLICATIONS

Duda, Richard O. et al., "Use of the Hough Transformation to Detect Lines and Curves in Pictures," Communications of the ACM vol. 15, No. 1, 1972, pp. 11-15.
(Continued)

*Primary Examiner* — Allen C Wong
(74) *Attorney, Agent, or Firm* — Finnegan, Henderson, Farabow, Garrett & Dunner, LLP

(57) ABSTRACT

A detection system for a vehicle is provided. The detection system may include at least one image capture device configured to acquire a plurality of images of an area forward of the vehicle, the area including a curb separating a road surface from an off-road surface and a data interface. The detection system may also include at least one processing device programmed to receive the plurality of images via the data interface, and determine a plurality of curb edge line candidates in the plurality of images. The at least one processing device may be further programmed to identify at least one edge line candidate as an edge line of the curb.

24 Claims, 26 Drawing Sheets

Related U.S. Application Data continuation of application No. 15/905,777, filed on Feb. 26, 2018, now Pat. No. 10,303,958, which is a continuation of application No. 15/253,824, filed on Aug. 31, 2016, now Pat. No. 9,916,509, which is a continuation of application No. 14/712,580, filed on May 14, 2015, now Pat. No. 9,443,163.

(60) Provisional application No. 61/993,050, filed on May 14, 2014.

(51) Int. Cl.

| | | |
|---|---|---|
| *H04N 7/18* | (2006.01) | |
| *G06T 7/00* | (2017.01) | |
| *G06T 7/13* | (2017.01) | |
| *G08G 1/16* | (2006.01) | |
| *B60W 30/09* | (2012.01) | |
| *B60W 50/14* | (2020.01) | |
| *G06K 9/62* | (2006.01) | |
| *G06T 3/00* | (2006.01) | |

(52) U.S. Cl.
CPC ....... *G06K 9/00798* (2013.01); *G06K 9/4604* (2013.01); *G06K 9/6267* (2013.01); *G06T 3/0093* (2013.01); *G06T 7/13* (2017.01); *G06T 7/97* (2017.01); *G08G 1/166* (2013.01); *G08G 1/167* (2013.01); *H04N 7/183* (2013.01); *G06T 2207/10021* (2013.01); *G06T 2207/30241* (2013.01); *G06T 2207/30261* (2013.01)

(58) Field of Classification Search
CPC ........ B60W 30/09; G06T 3/0093; G06T 7/13; G06T 7/97; G06T 2207/10021; G06T 2207/30241; G06T 2207/30261; G08G 1/166; G08G 1/167; H04N 7/183
USPC ........................................................ 348/148
See application file for complete search history.

(56) References Cited

U.S. PATENT DOCUMENTS

| | | | |
|---|---|---|---|
| 2009/0303026 A1 | 12/2009 | Broggi et al. | |
| 2010/0017060 A1* | 1/2010 | Zhang | G06T 7/73 701/41 |
| 2010/0201509 A1 | 8/2010 | Hara et al. | |
| 2010/0328644 A1 | 12/2010 | Lu et al. | |
| 2011/0246156 A1* | 10/2011 | Zecha | G06K 9/00342 703/6 |
| 2012/0218410 A1 | 8/2012 | Kim et al. | |
| 2013/0033371 A1 | 2/2013 | Schliemann et al. | |
| 2013/0271565 A1 | 10/2013 | Chen et al. | |
| 2013/0314503 A1* | 11/2013 | Nix | G06K 9/00805 348/46 |

OTHER PUBLICATIONS

Canny, John, "A Computational Approach to Edge Detection," Pattern Analysis and Machine Intelligence, IEEE Transactions on 6, 1986, pp. 679-698.

Baker, Simon et al., "Lucas-Kanada 20 Years On: A Unifying Framework," International Journal of Computer Vision, vol. 56, No. 3, 2004, pp. 221-255.

International Search Report and Written Opinion dated Nov. 3, 2015, in corresponding international application No. PCT/IB2015/001542, filed May 14, 2015 (12 pages).

First Office Action issued by the Chinese Patent Office dated Aug. 1, 2019 and its English translation thereof.

Second Office Action issued by the Chinese Patent Office in Counterpart Application No. 201580038137.9, dated May 14, 2020 and its English Translation Thereof (25 pages).

* cited by examiner

SYSTEMS AND METHODS FOR CURB DETECTION AND PEDESTRIAN HAZARD ASSESSMENT

CROSS REFERENCE TO RELATED APPLICATIONS

This application is a continuation of U.S. patent application Ser. No. 16/395,205, filed on Apr. 25, 2019 which is a continuation of U.S. patent application Ser. No. 15/905,777, filed on Feb. 26, 2018 (now U.S. Pat. No. 10,303,958), which is a continuation of U.S. patent application Ser. No. 15/253,824, filed on Aug. 31, 2016 (now U.S. Pat. No. 9,916,509), which is a continuation of U.S. patent application Ser. No. 14/712,580, filed on May 14, 2015 (now U.S. Pat. No. 9,443,163), which claims the benefit of priority of U.S. Provisional Patent Application No. 61/993,050, filed on May 14, 2014. The foregoing applications are incorporated herein by reference in their entirety.

BACKGROUND

I. Technical Field

The present disclosure relates generally to autonomous vehicle navigation and, more specifically, to systems and methods that use cameras to detect a curb associated with a roadway and assess potential pedestrian hazards.

II. Background Information

As technology continues to advance, the goal of a fully autonomous vehicle that is capable of navigating on roadways is on the horizon. Primarily, an autonomous vehicle may be able to identify its environment and navigate without input from a human operator. Autonomous vehicles may also take into account a variety of factors and make appropriate decisions based on those factors to safely and accurately reach an intended destination. For example, various objects—such as other vehicles and pedestrians—are encountered when a vehicle typically travels a roadway. Autonomous driving systems may recognize these objects in a vehicle's environment and take appropriate and timely action to avoid collisions. Additionally, autonomous driving systems may identify other indicators—such as traffic signals, traffic signs, and lane markings—that regulate vehicle movement (e.g., when the vehicle must stop and may go, a speed at which the vehicle must not exceed, where the vehicle must be positioned on the roadway, etc.). Autonomous driving systems may need to determine when a vehicle should change lanes, turn at intersections, change roadways, etc. As is evident from these examples, many factors may need to be addressed in order to provide an autonomous vehicle that is capable of navigating safely and accurately.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle and cause a navigational response based on an analysis of images captured by one or more of the cameras.

Consistent with a disclosed embodiment, a detection system for a vehicle is provided. The detection system may include at least one image capture device programmed to acquire a plurality of images of an area forward of the vehicle, the area including a curb separating a road surface from an off-road surface and a data interface. The detection system may also include at least one processing device configured to receive the plurality of images via the data interface, and determine a plurality of curb edge line candidates in the plurality of images. The at least one processing device may be further programmed to identify at least one edge line candidate as an edge line of the curb.

Consistent with another embodiment, a vehicle is provided. The vehicle may include a body, at least one image capture device configured to acquire a plurality of images of an area forward of the vehicle, the area including a curb separating a road surface from an off-road surface, and a data interface. The vehicle may also include at least one processing device programmed to receive the plurality of images via the data interface, and determine a plurality of curb edge line candidates in the plurality of images. The at least one processing device may be further programmed to identify at least one curb edge line candidate as an edge line of the curb, and identify regions in the plurality of images that correspond to the road surface and the off-road surface based on the at least one curb edge line.

Consistent with another disclosed embodiment, a method for curb detection is disclosed. The method may include acquiring, via at least one image capture device, a plurality of images of an area forward of a vehicle, the area including a curb separating a road surface from an off-road surface, and determining a plurality of curb edge line candidates in the plurality of images. The method may also include determining a height of a step function associated with each curb edge line candidate, and identifying at least one curb edge line candidate as an edge line of the curb based on the determined heights.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
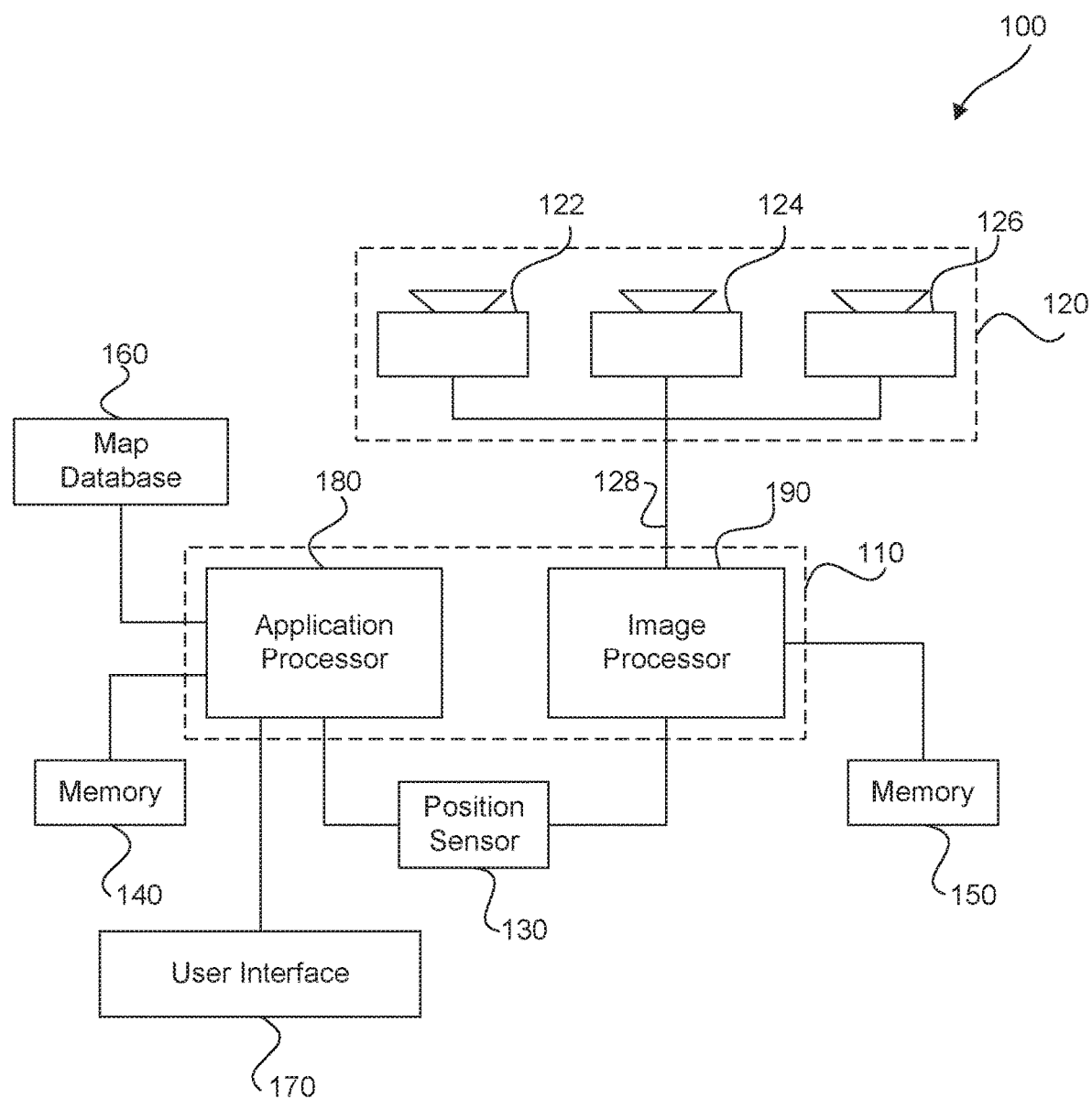
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, and a user interface 170. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Both applications processor 180 and image processor 190 may include various types of processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.).

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
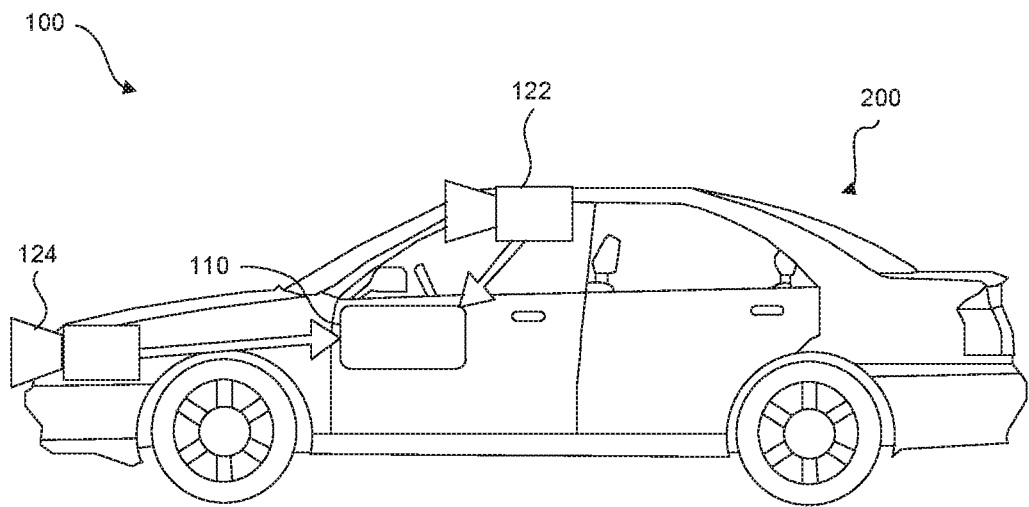
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
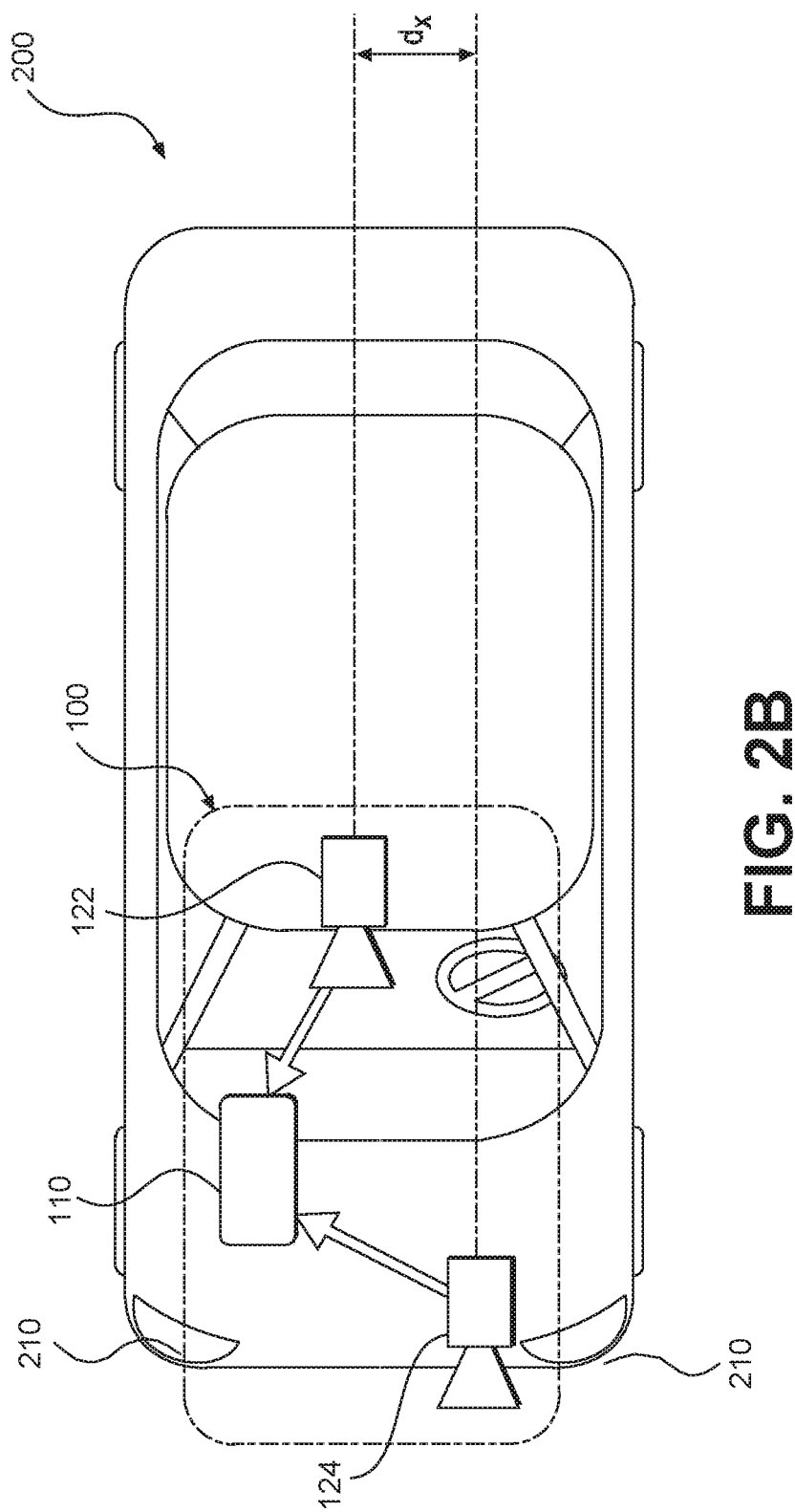
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
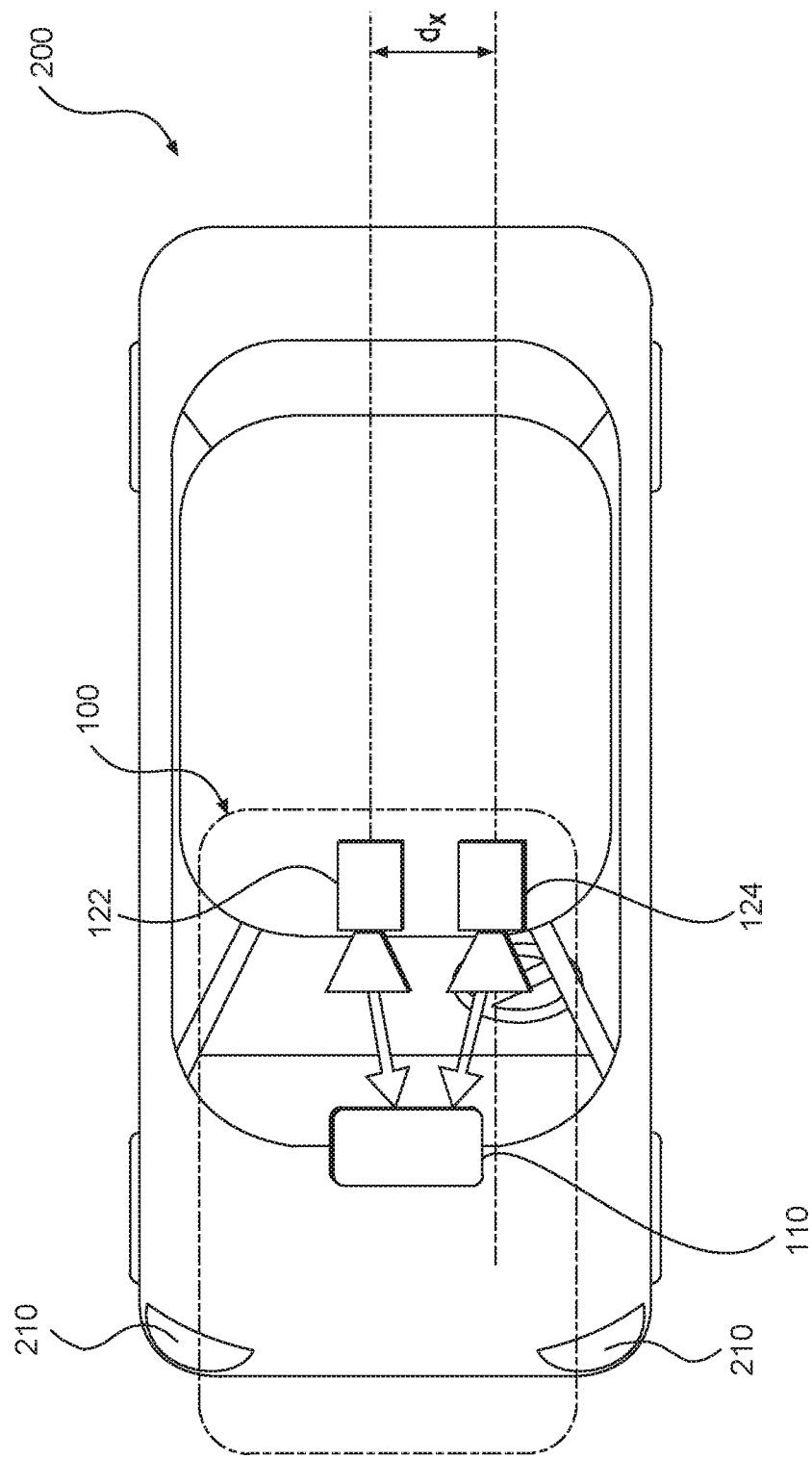
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
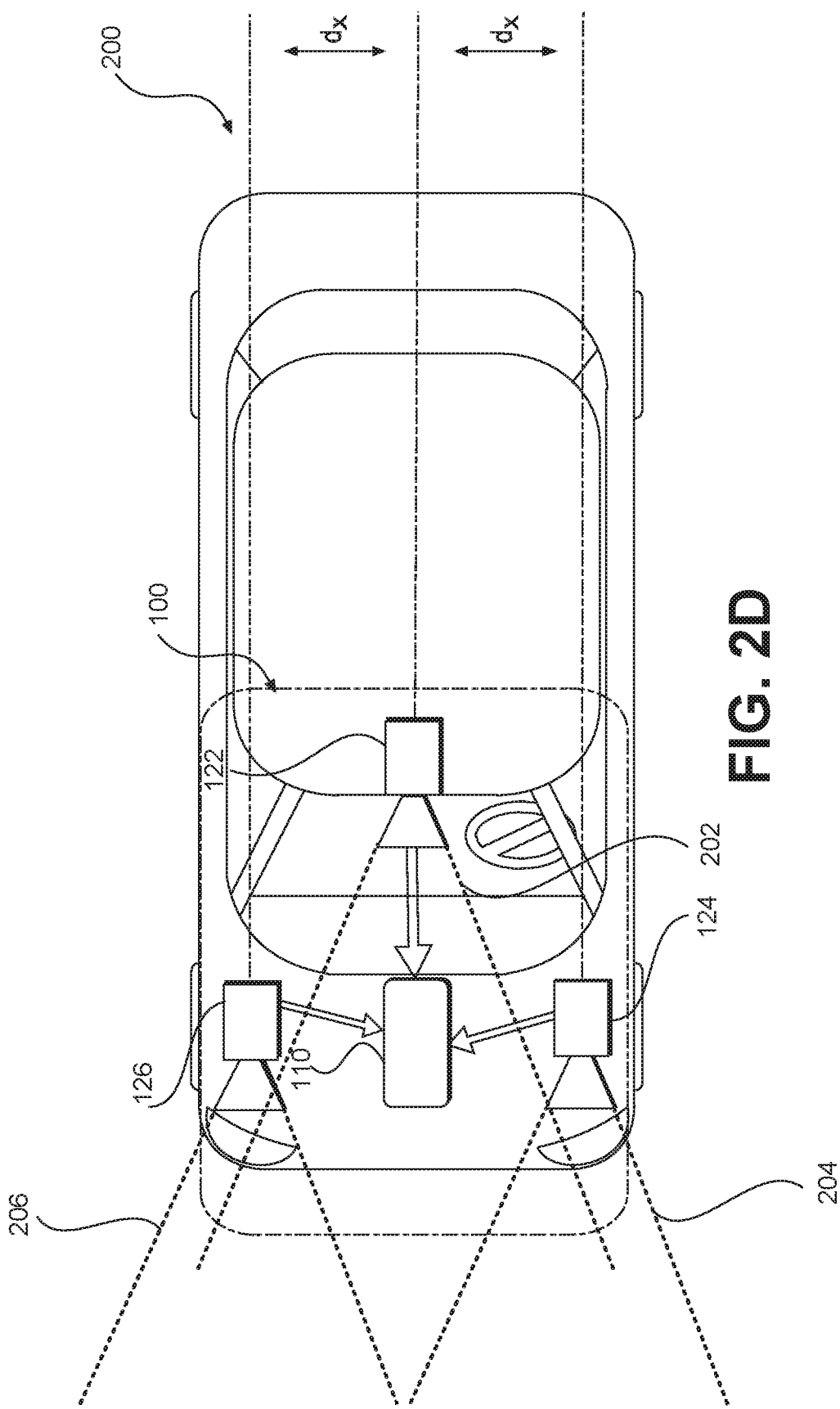
FIG. 2D is a diagrammatic top view representation of yet another embodiment of a vehicle including a system consistent with the disclosed embodiments.
Figure 2E:
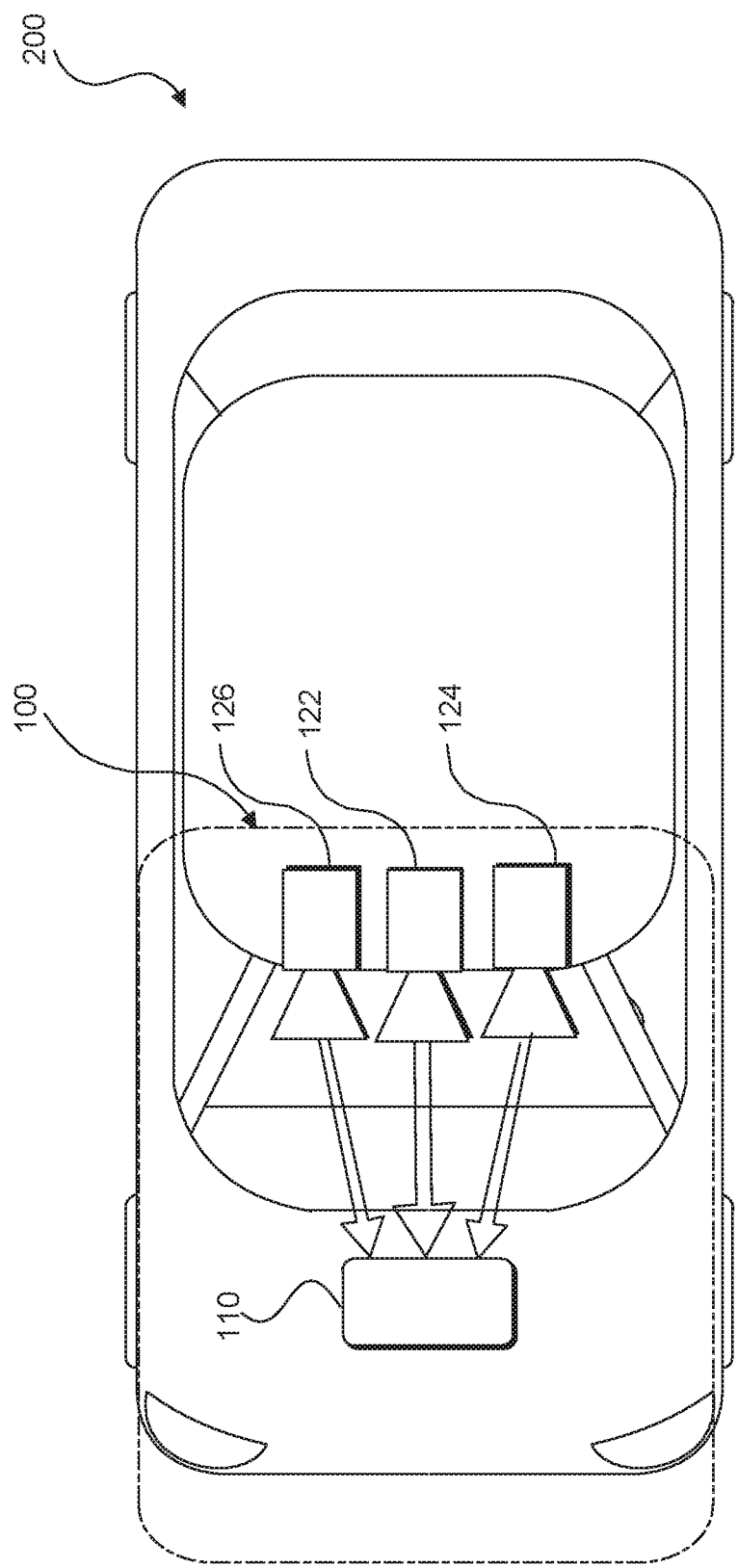
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280× 960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
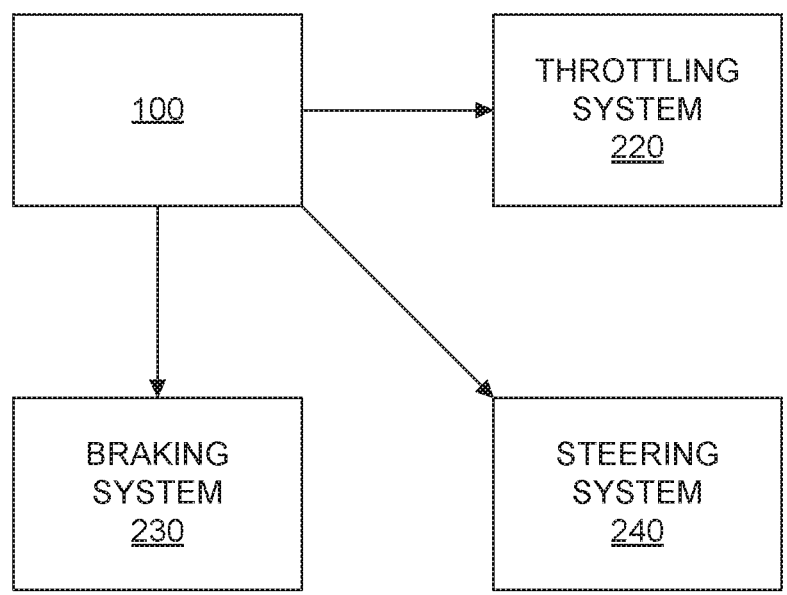
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
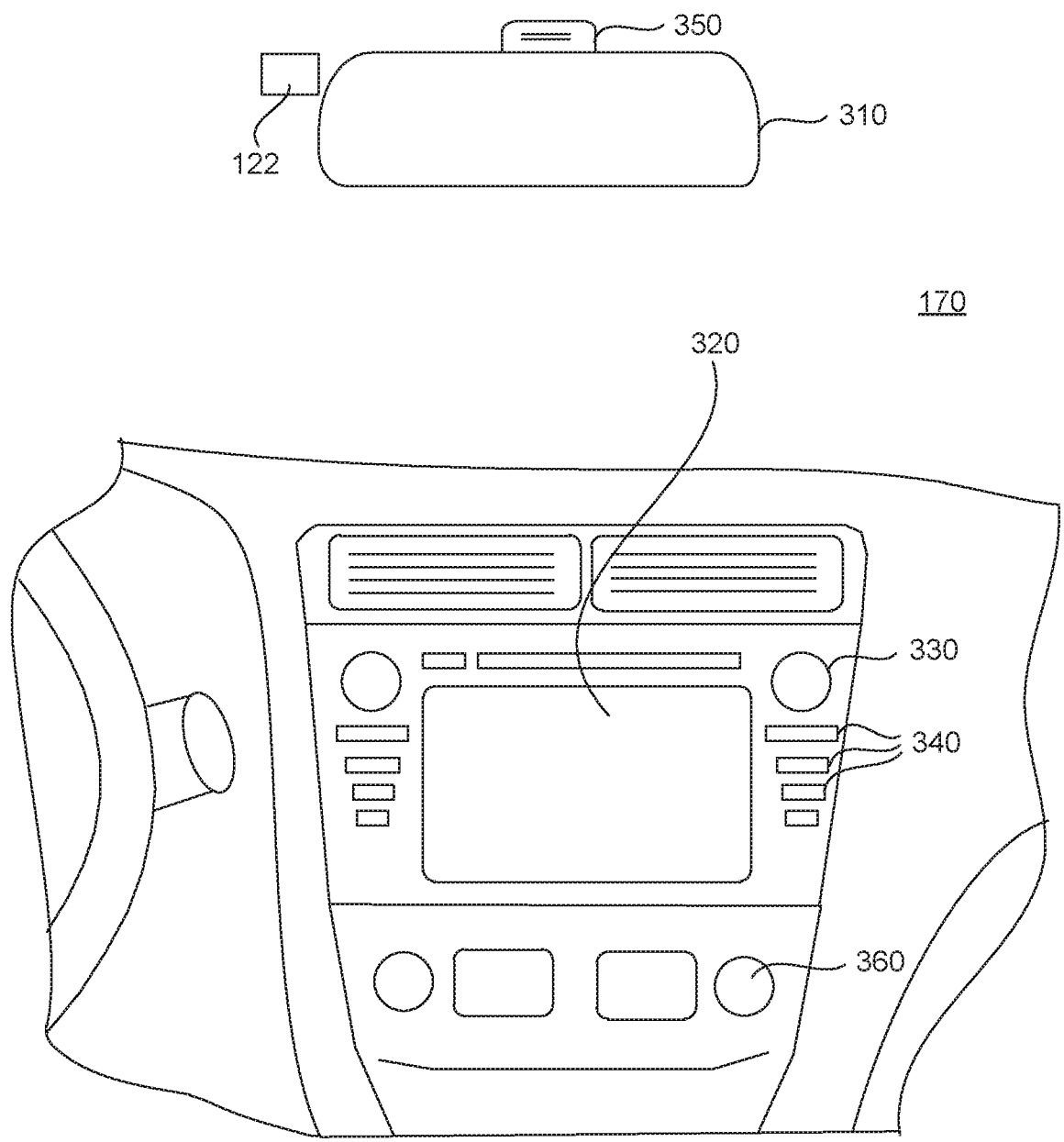
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
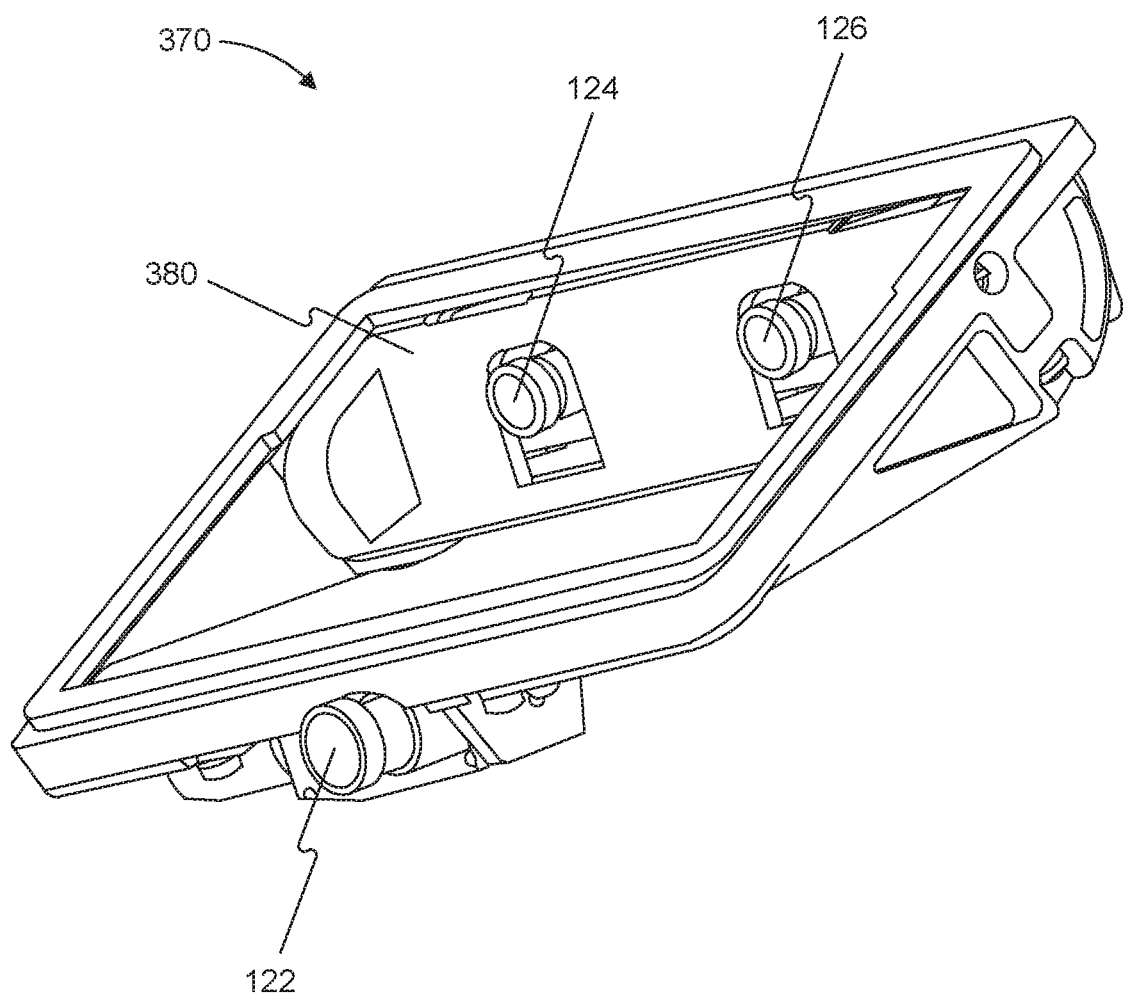
FIG. 3B is an illustration of an example of a camera mount that is configured to be positioned behind a rearview mirror and against a vehicle windshield consistent with the disclosed embodiments.
Figure 3C:
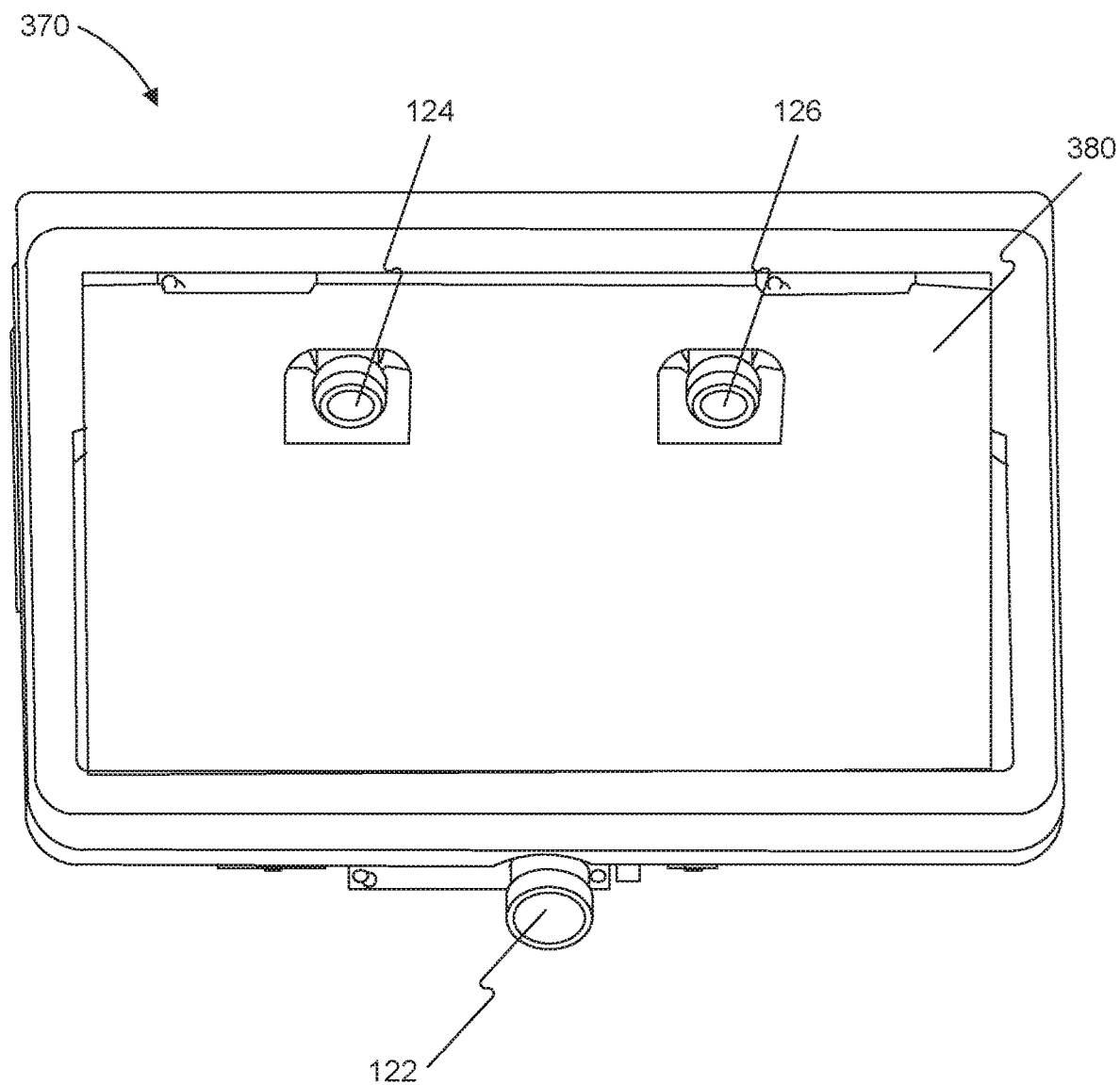
FIG. 3C is an illustration of the camera mount shown in FIG. 3B from a different perspective consistent with the disclosed embodiments.
Figure 3D:
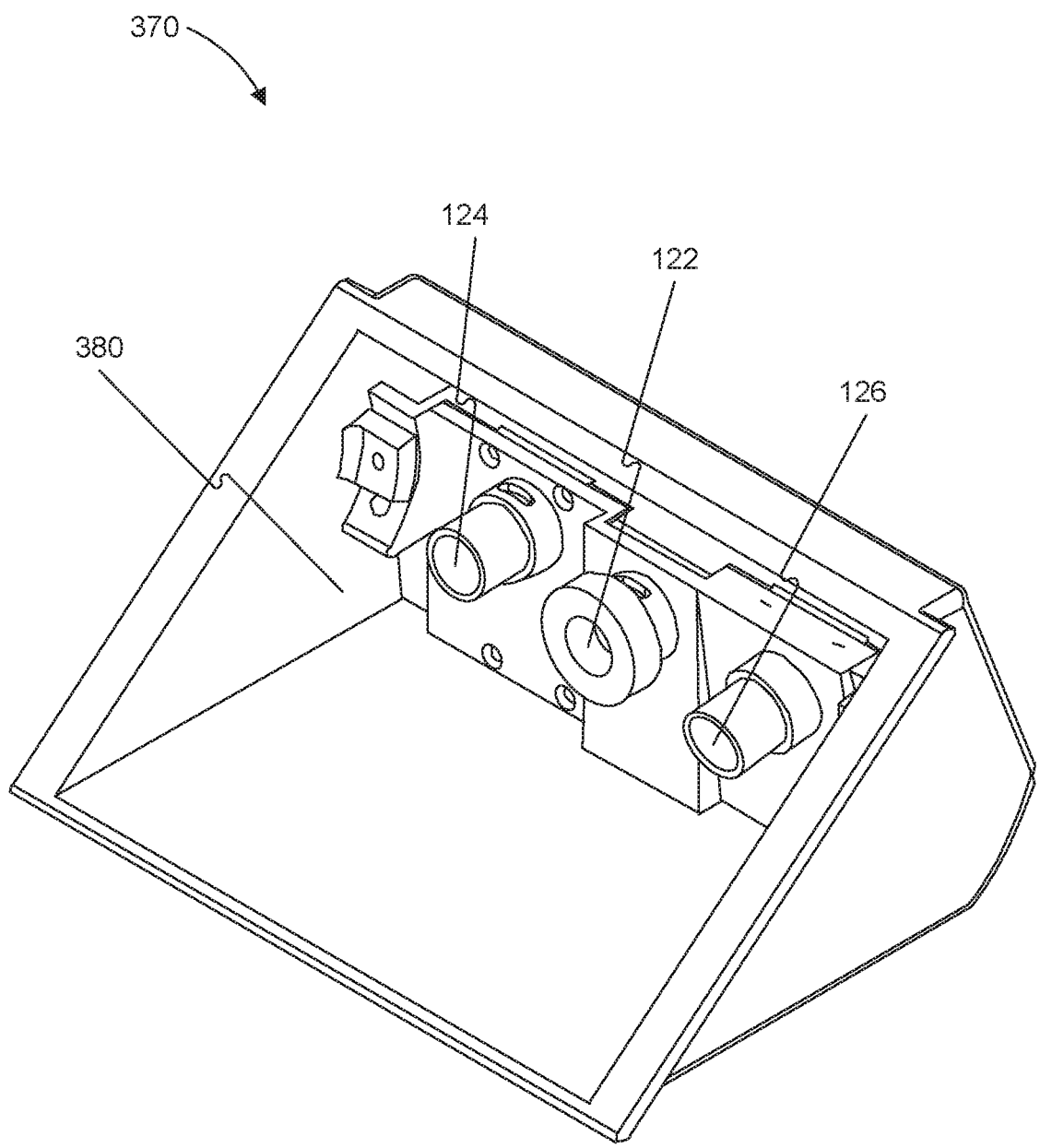
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
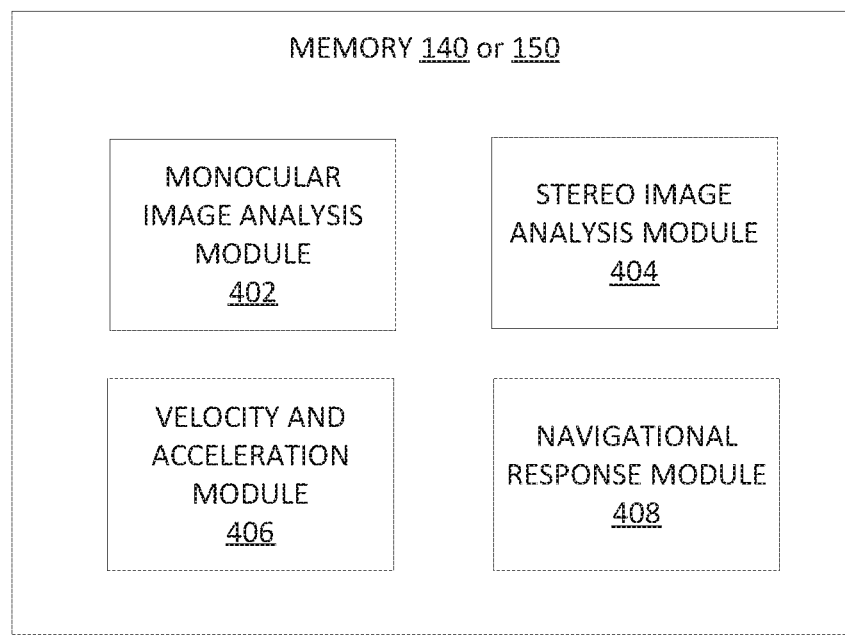
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402-408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Figure 5A:
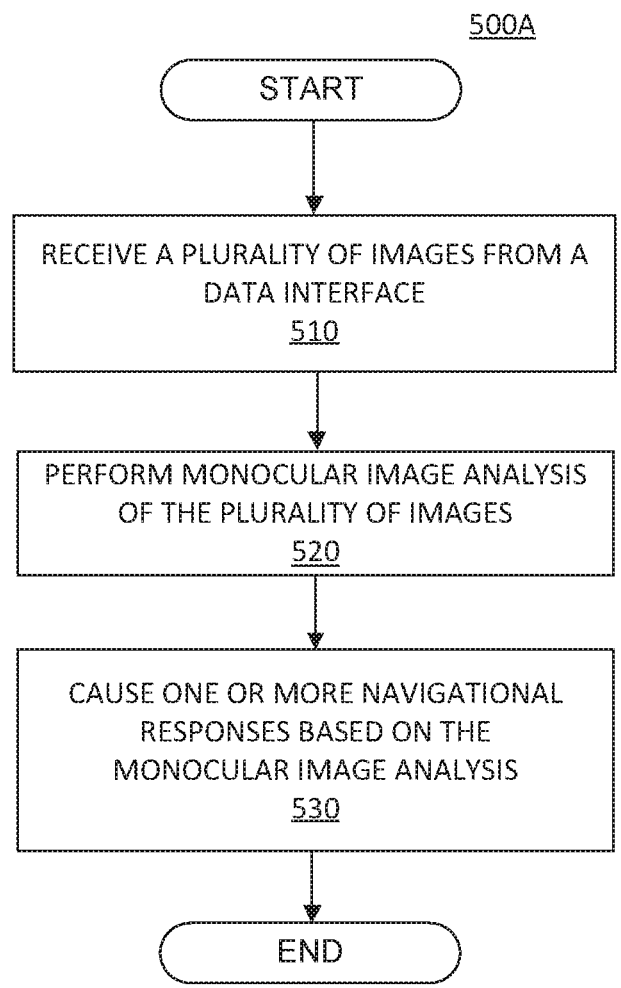
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
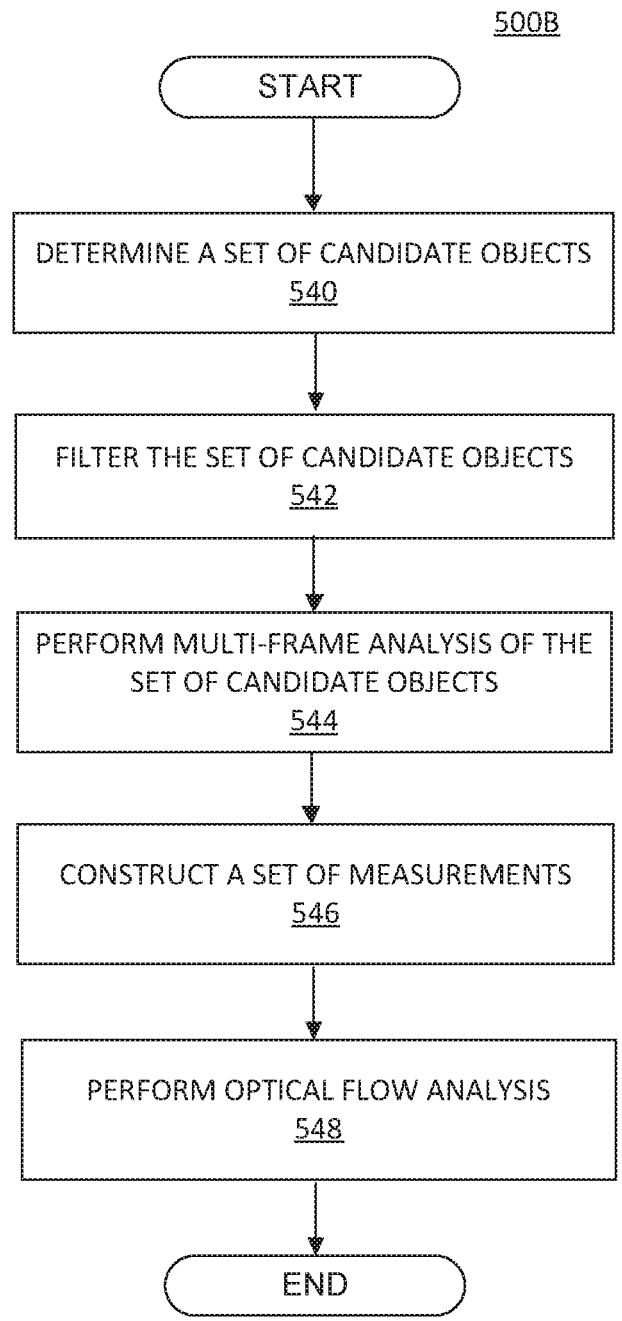
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
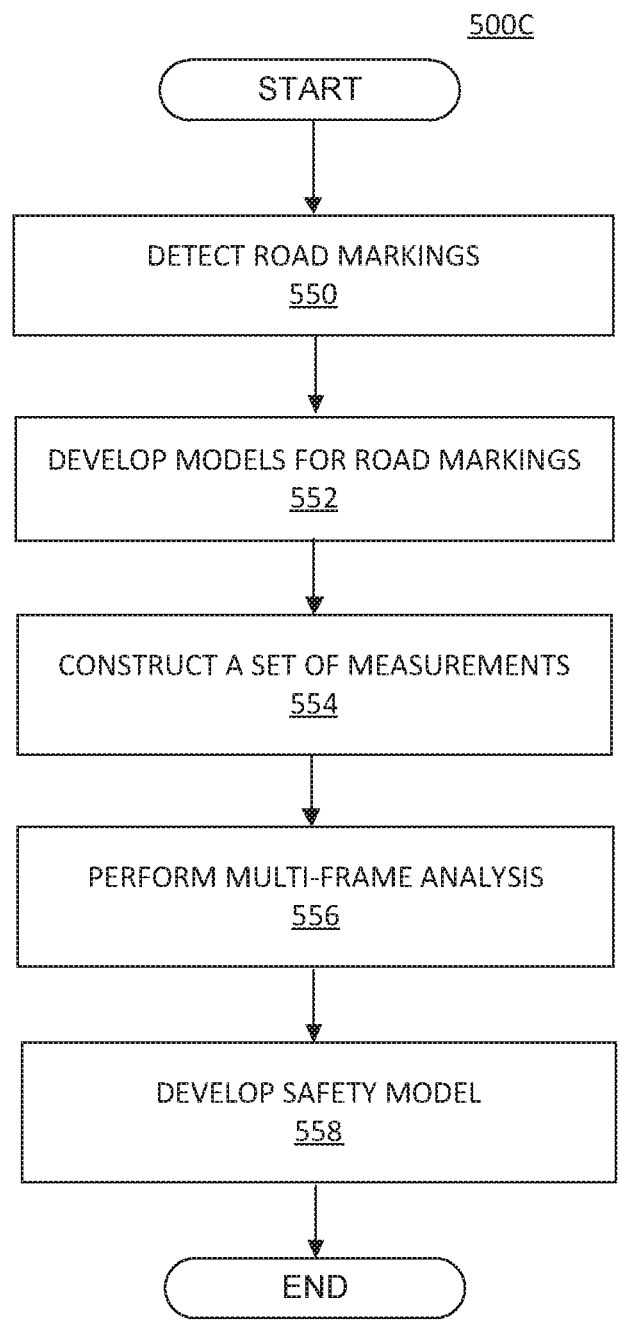
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
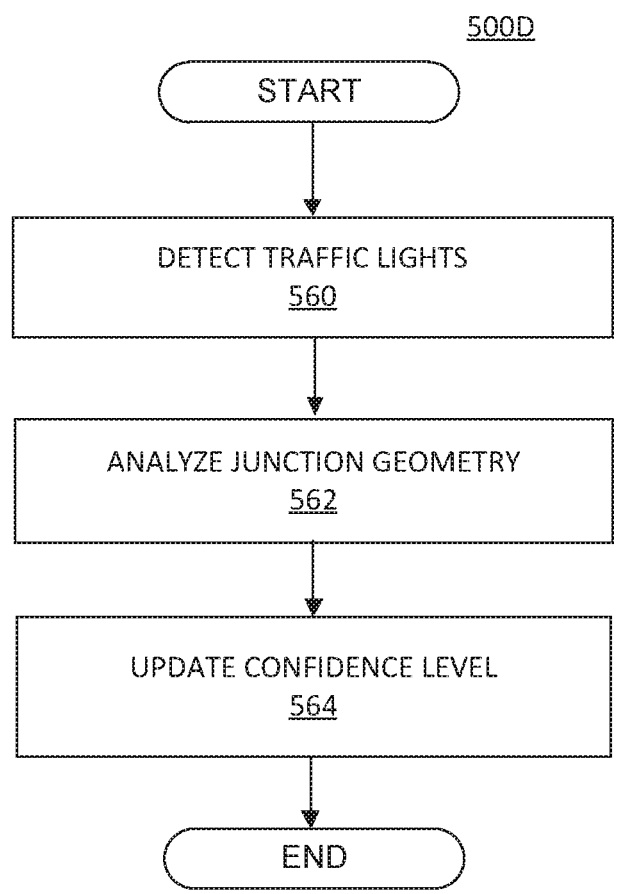
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
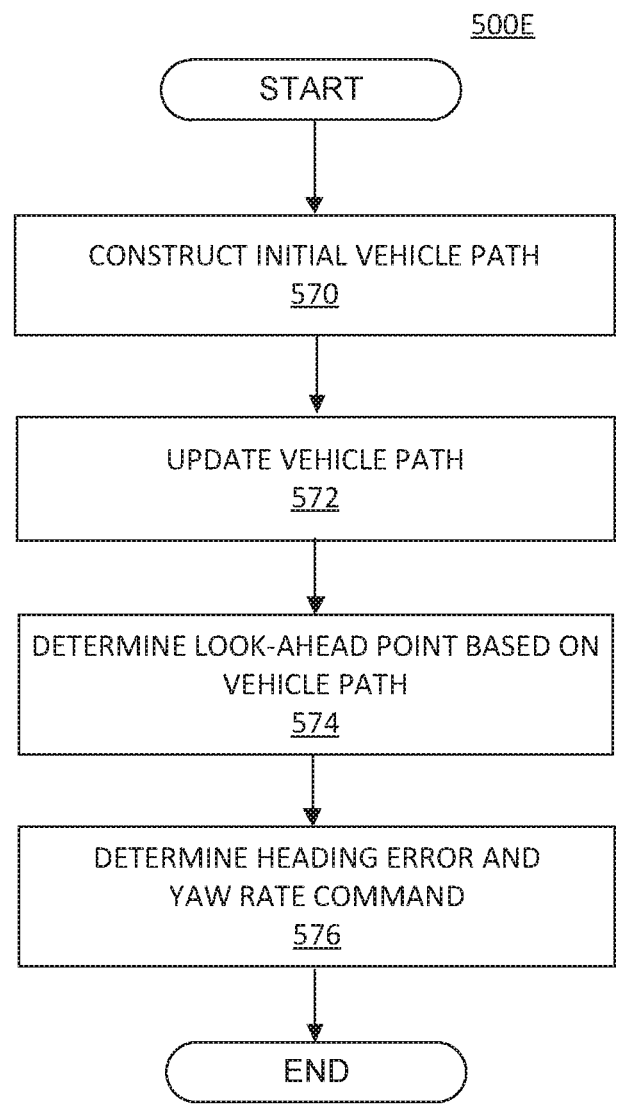
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
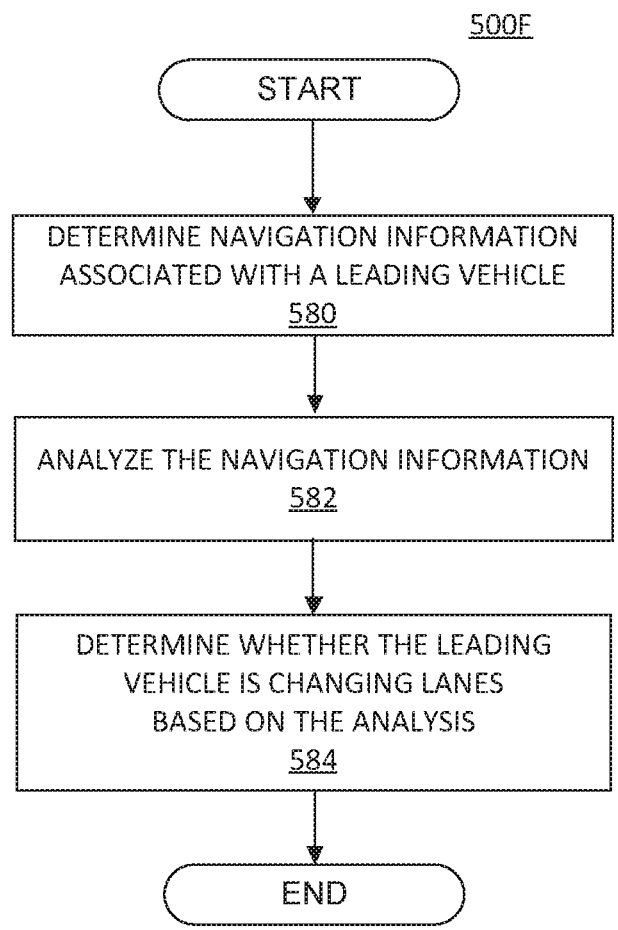
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2 + \delta_x^2)/$ $2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
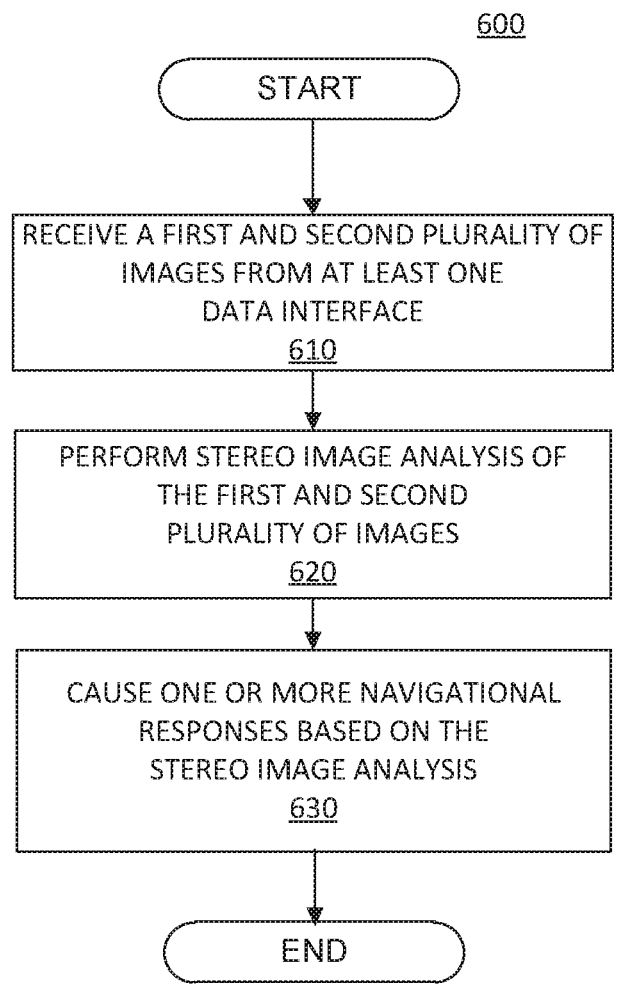
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
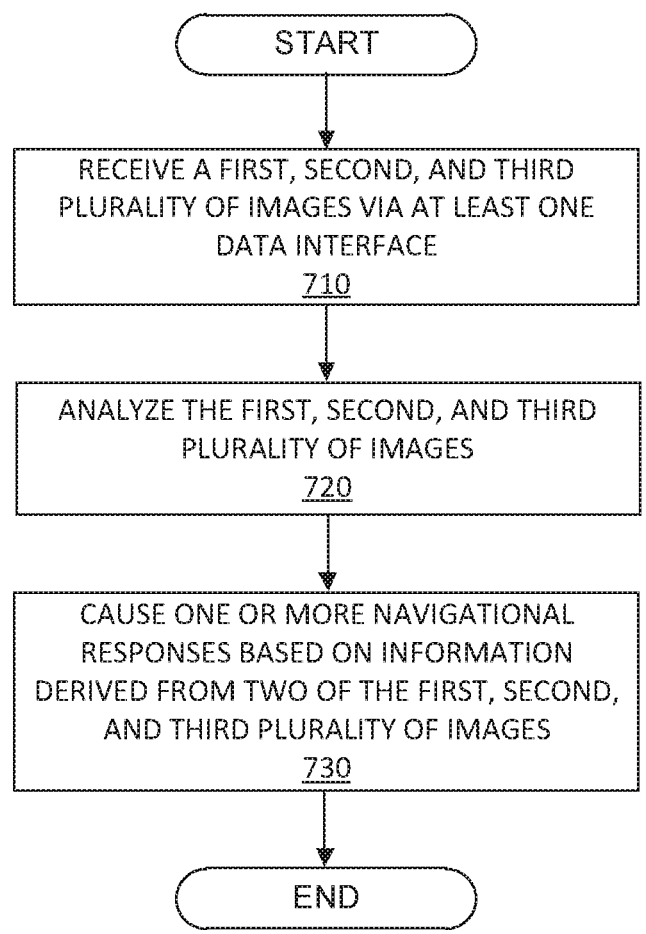
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126— including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof Curb Detection and Pedestrian Hazard Assessment As described herein, system 100 may include technical features and capabilities that allow for the detection of certain elements that assist system 100 with staying on a road and avoiding collisions. In one example, system 100 is configured to detect road boundaries that define a roadway and/or pedestrians that are in the vicinity of the roadway. Knowledge of a physical road boundary allows system 100 to either alert a driver or control the vehicle in such a way as to avoid driving off of the road and/or colliding with an object or pedestrian. For example, identifying a road boundary helps to provide physical protection to pedestrians on a sidewalk adjacent to the road by demarcating the region in which pedestrians are likely to be present.

In an exemplary embodiment, system 100 may be configured to detect a curb as a road boundary. A curb in most situations is a physical boundary that separates the road surface from an off-road surface (e.g., sidewalk, path, median, building, etc.). Keeping a vehicle from crossing a curb helps to keep the vehicle on the road and pedestrians on the sidewalk safe. However, pedestrians situated on the road surface are at a greater risk of being hit by moving vehicles. Therefore, an ability to classify pedestrians as either on-curb or off-curb, in addition to an estimation of the vehicle and pedestrian trajectory provides system 100 with an ability to assess a hazard posed by the vehicle to pedestrians. Disclosed embodiments include curb detection and pedestrian hazard assessment features to provide these and other functionalities to system 100.

To implement the curb detection and pedestrian hazard assessment functionality, processing unit 110 may receive images captured by at least one of image capture devices 122, 124, 126 and perform one or more image analysis processes. For example, processing unit 110 may perform a curb identification process to identify a curb in the captured images and a pedestrian identification process to determine a location of pedestrians relative to a road surface.

Figure 8:
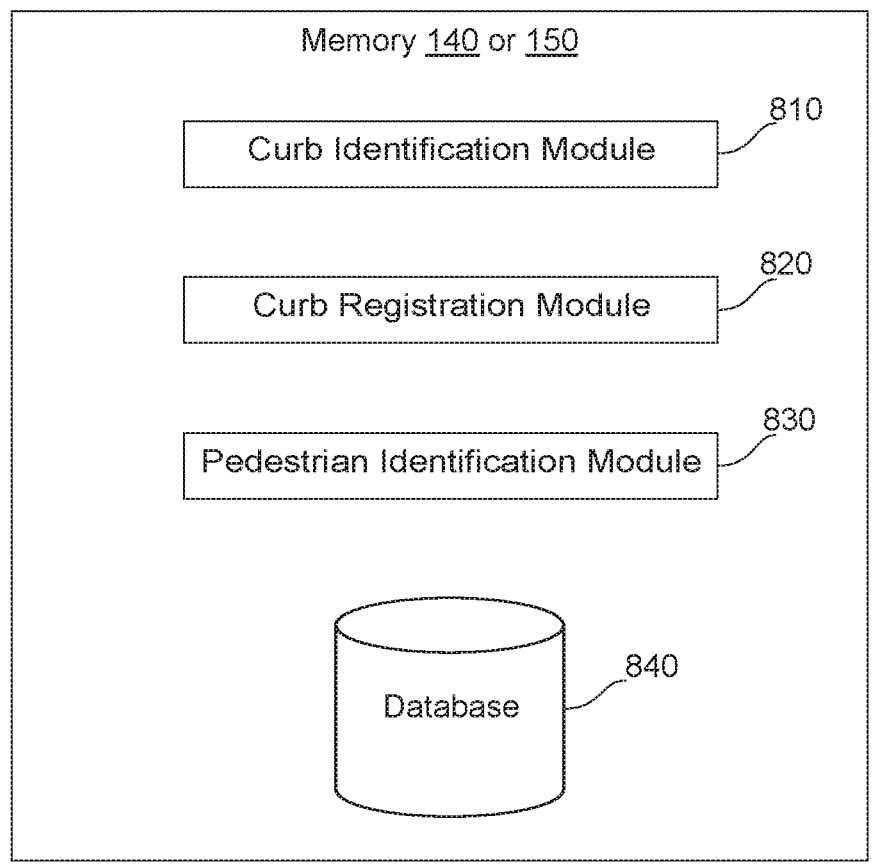
FIG. 8 is an block diagram of an exemplary memory configured to store instructions for performing one or more operations consistent with disclosed embodiments.

In some embodiments, memory 140 and/or 150 may store instructions programmed such that, upon execution by a processing device, curb detection and/or pedestrian hazard assessment functions are provided. As shown in FIG. 8, memory 140 and/or 150 may store a curb identification module 810, a curb registration module 820, a pedestrian identification module 830, and a database 840. Curb identification module 810 may store instructions for identifying elements of an image that correspond to a curb. Curb registration module 820 may store instructions for modeling a curb and/or determining the properties of each identified curb. Pedestrian identification module 830 may store instructions for detecting and classifying a pedestrian in one or more captured images. Database 840 may be configured to store data associated with curb detection and/or pedestrian hazard assessment functions. Further, curb identification module 810, curb registration module 820, and pedestrian identification module 830 may store instructions executable by one or more processors (e.g., processing unit 110), alone or in various combinations with each other. For example, curb identification module 810, curb registration module 820, and pedestrian identification module 830 may be configured to interact with each other and/or other modules of system 100 to perform functions consistent with disclosed embodiments.

Database 840 may include one or more memory devices that store information and are accessed and/or managed through a computing device, such as processing unit 110. In some embodiments, database 840 may be located in memory 140 or 150, as shown in FIG. 8. In other embodiments, database 840 may be located remotely from memory 140 or 150, and be accessible to other components of system 100 (e.g., processing unit 120) via one or more wireless connections (e.g., a wireless network). While one database 840 is shown, it should be understood that several separate and/or interconnected databases may make up database 840. Database 840 may include computing components (e.g., database management system, database server, etc.) configured to receive and process requests for data stored in memory devices associated with database 840 and to provide data from database 840 (e.g., to processing unit 110).

In some embodiments, database 840 may be configured to store data associated with providing curb detection and/or pedestrian hazard assessment functions. For example, database 840 may store data, such as images, parts of images, maps, algorithms, sets of values, or the like, which may allow processing unit 110 to identify information detected in an image. For instance, database 840 may store information that allows system 100 to identify a curb and/or pedestrians, such as stored images of curbs and/or images of pedestrians.

Figure 9:
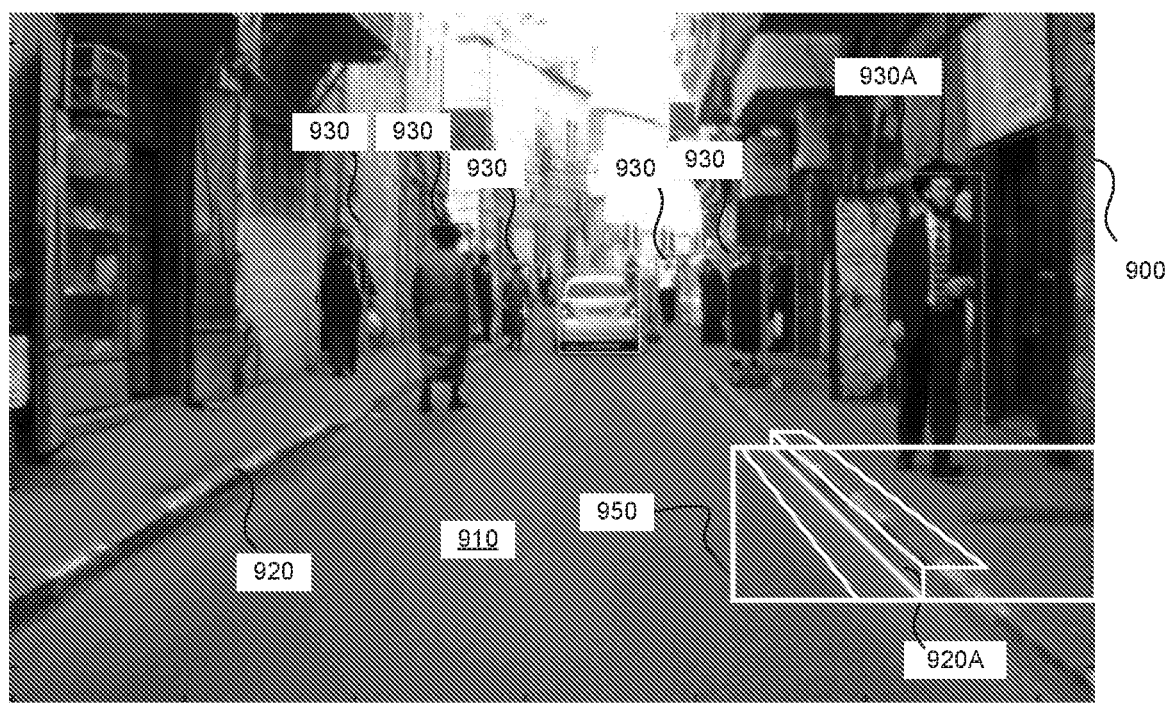
FIG. 9 is an illustration of an image of an environment of a vehicle consistent with disclosed embodiments.

FIG. 9 depicts an exemplary image 900 captured by one of image capture devices 122, 124, 126. Image 900 includes an environment that may generally represent a setting that is seen as a vehicle travels on a road. For example, image 900 includes a road 910 defined between opposing curbs 920, and a plurality of pedestrians 930. In an exemplary embodiment, system 100 may be configured to identify and/or differentiate between the various features of image 900. Knowledge of these features allows system 100 to make decisions that help to promote safe operation of the vehicle. For example, identification of curbs 920 provides information that helps to keep the vehicle within the physical boundaries of road 910, away from pedestrians 930 on the sidewalk. Further, identification of curbs 920 allows system 100 to identify pedestrians that are on a surface of road 910, and thus, identify potential pedestrian hazards, which may require further action to avoid a collision.

The entirety of image 900 may represent a FOV of one or more of image capture devices 122, 124, 126. In some embodiments, system 100 may be configured to identify a region of interest (ROI) 950 within the FOV. In an exemplary embodiment, system 100 may be a detection system configured to process a selected ROI 950 and/or a full FOV associated with image 900 (and/or a plurality of images of which image 900 is one) to identify a curb 920.

In one embodiment, system 100 (e.g., curb identification module 810) may be configured to detect linear image edges to serve as curb edge line candidates. Curb identification module 810 may analyze an image to identify one or more edges lines of a curb, based on the identified curb edge line candidates. For example, curb identification module 810 may identify a bottom edge of a curb, which may be a transition line between the curb and the road surface in the image, by analyzing the edge line candidates to determine which, if any, include characteristics that match that of a curb bottom edge.

In some embodiments, system 100 (e.g., curb registration module 820) may be configured to determine whether the curb edge line candidate is part of a curb (e.g., the candidate would be correctly identified as an edge line of a curb) by determining whether a motion field of pixels in the vicinity of the curb edge line candidate is consistent with a three-dimensional structure of a step having an appropriate height. For example, system 100 may model a curb as a sharp step function and, using a plurality of captured images (e.g., a previous and current image), compute what the properties of the step are that would best model the motion field of pixels between the captured image frames. FIG. 9 illustrates an example of an identified curb 920A in the vicinity of the closest-in-path-pedestrian 930A.

In an exemplary embodiment, curb identification module 810 may identify curb edge line candidates by using an image analysis method. For example, system 100 may use a method that utilizes the Hough transform, which is an image processing technique that may be used to identify lines in an image. In another example, system 100 may use the Canny edge detection technique to identify edges present in an image using image gradient analysis. Other image analysis methods may be used, such as other methods that group image pixels by intensity, contrast, or other parameter to identify lines and/or curves present an image.

Curb edges, including the curb bottom edge, commonly appear as an elongated linear edge in the intensity pattern of an image, thus allowing them to be identified using one of the above described image analysis methods. However, this is also true for non-curb objects and road marks containing long linear features appearing in the image. Therefore, an elongated linear edge found in an image is not necessarily an edge of a curb. Curb registration module 820 may perform a curb detection process to analyze curb edge line candidates to identify a curb edge lines (and therefore the curb).

Figure 10A:
FIGS. 10A and 10B are illustrations of images that include a curb consistent with disclosed embodiments.
Figure 10B:

FIG. 10A depicts an exemplary image 1000, including linear edges 1010 identified by curb identification module 810 as potential edges of a curb 1020. Some of linear edges 1010 may correspond to edge lines of curb 1020 (e.g., top and/or bottom edges of the curb), while some other linear edges 1010 may correspond to non-curb objects, such as cracks, seams, markings, etc. Curb registration module 820 may analyze image 1000 and linear edges 1010 to determine the location of and/or model curb 1020. FIG. 10B depicts image 1000 with curb 1020 having been determined and modeled according to disclosed embodiments.

Curb registration module 820 may be configured to store instructions associated with one or more algorithms that allow curb 1020 to be identified and modeled as shown in FIG. 10B. For example, curb registration module 820 may include a curb analysis algorithm (CAA) that may allow system 100 to identify a curb within an image and/or plurality of images in a video sequence. In an exemplary embodiment, processing unit 110 may use the CAA to determine whether a curb edge line candidate corresponds to a curb edge line (e.g., a curb bottom edge or a curb top edge).

Figure 11:
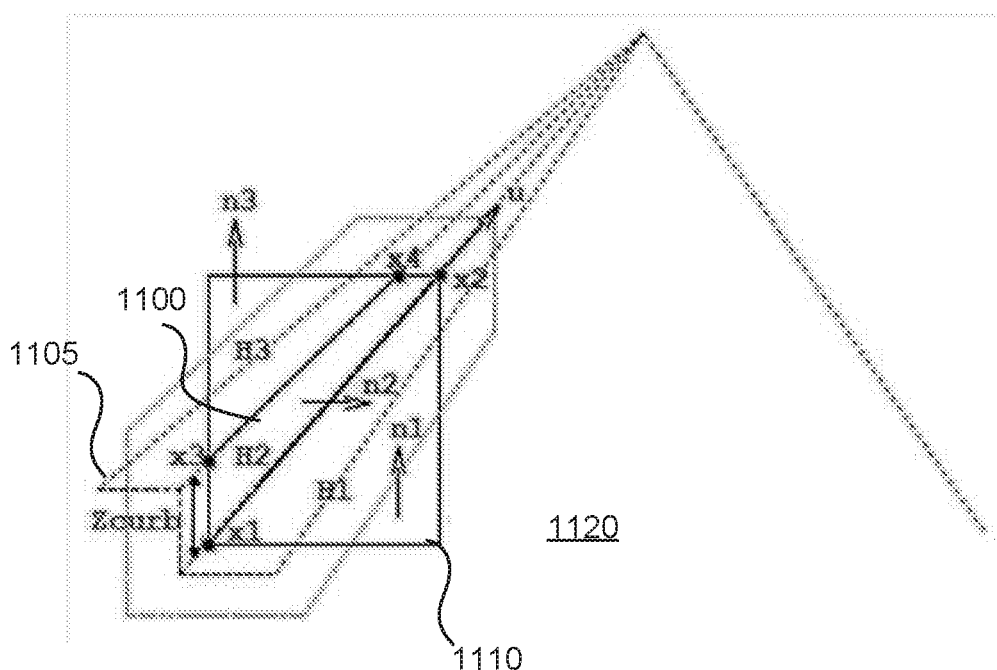
FIG. 11 is an illustration of an exemplary modeled curb consistent with disclosed embodiments.

FIG. 11 depicts an example of a modeled step function 1100 which may be used to model a curb that corresponds to a real curb 1105, including at least some parameters that may be used by system 100 when executing the CAA. As shown in FIG. 11, system 110 may analyze a region of interest 1110 across multiple captured image frames to model step function 1100, while a mask region 1120 is not considered. This may allow processing unit 110 to focus only on pixels around a curb edge line candidate. In an exemplary embodiment, in order to determine whether a curb edge line candidate corresponds to a curb edge line, a height (hereinafter "$Z_{curb}$") of step function 1100 (i.e., a height of an associated modeled curb) may be calculated. For example, $Z_{curb}$ may be calculated for a given curb edge line candidate detected in one image of a video sequence, the previous frame, and known, assumed, or estimated parameters (e.g., the camera's calibration and ego-motion parameters).

In one example, curb registration module 820 may utilize a parametric image warp function $\tilde{W}(x; y; p)$ and an error minimization function $E(p)$ to calculate $Z_{curb}$ for a given curb edge line candidate. The image warp function $\tilde{W}(x; y;$ p) may be a piecewise homography warp whereby each homography operates on different portions of a region of interest 1110 to match pixels in three-dimensional space between captured frame images. For example, the image warp function W(x; y; p) may be defined as:

$$\tilde{W}(x, y; p) = \begin{cases} H_1(x, y, 1)^T & (\vec{x}_2 - \vec{x}_1)^T((x, y)^T - \vec{x}_1) < 0 \\ H_3(x, y, 1)^T & (\vec{x}_4 - \vec{x}_3)^T((x, y)^T - \vec{x}_3) < 0 \\ H_3(x, y, 1)^T & \text{otherwise} \end{cases}$$

Each homography $H_1$, $H_2$, and $H_3$ may correspond to a portion of region of interest 1120, as shown in FIG. 11. In an exemplary embodiment, $H_1$ may represent a region inside of the bottom edge of the curb 1105 (e.g., the road surface), $H_2$ may represent a region between the bottom edge of the curb 1105 and the top edge of the curb 1105 (e.g., the height of the curb), and $H_3$ may represent a region that extends away from the top of the curb 1105 and the road surface (e.g., the sidewalk), all within region of interest 1120. System 100 may use the image warp function $\tilde{W}$ (x; y; p) to follow pixels between a plurality of images, such as a current image $I_a$ and a previous image $I_b$, to determine the step function associated with the curb edge line candidate.

In an exemplary embodiment, each homography $H_1$, $H_2$, and $H_3$ may be calculated based on a homography determination equation, such as:

$$H_i = K\left(R_{ab} - \frac{n_i t_{ab}^T}{d_i}\right)K^{-1}$$

In general, the parameters that define each homography may be known, assumed, or estimated based on information associated with vehicle 200 and an image capture device 122, 124, 126. For example, K may be an image capturing device parameter which may take into account focal lengths, image centers, and/or other camera settings, and may be defined as:

$$K = \begin{bmatrix} fx & 0 & xo \\ 0 & fy & yo \\ 0 & 0 & 1 \end{bmatrix}$$

The inter-frame ego-motion parameters may be found using:

$$t_{ab} = (\Delta X, \Delta Y, \Delta Z)^T$$

$$\Delta\theta_{ab} = (\Delta\alpha, \Delta\beta, \Delta\gamma)^T$$

$R_{ab} = R_z(\Delta\gamma)R_y(\Delta\beta)R_x(\Delta\alpha)$ may be the camera rotation matrix composed of pitch (x), yaw (y), and roll (z) rotations (for camera pitch $\alpha$, yaw $\beta$, and roll $\gamma$ angles relative to the road plane), between frames $I_a$ and $I_b$ in the camera coordinate system of frame $I_a$.

Regarding the surface normals $n_i$:

$$n_1 = n_3 = R_{calib}\hat{Z} = R_{calib}(0,0,1)^T$$

$$n_2 = -u \times n_1$$

In these equations, $u = (X_2 - X_1)/\|(X_2 - X_1)\|$, u being a unit vector in the direction of the curb's bottom edge, and $R_{calib} = Rz(\gamma)Ry(\beta)Rx(\alpha)$, $R_{calib}$ being a road calibration matrix.

Regarding the distances to the three planes $d_i$:

$$d_1 = Z_{cam}$$

$$d_2 = |X_1^T n_2|$$

$$d_3 = Z_{cam} - Z_{curb}$$

In the above equations, the world coordinates $X_1$ and $X_2$ of the image coordinates $\vec{x}_1$ and $\vec{x}_2$ projected onto the road plane may be used. The image coordinates $\vec{x}_3$ $\vec{x}_4$ of the points corresponding to $\vec{x}_1$ and $\vec{x}_2$ on the upper part of the step function 1100 may define the line separating regions $H_2$ and $H_3$ within the region of interest 1110. These points may thus be defined:

$$X_{1,2} = \frac{d_1 K^{-1} \bar{x}_{1,2}}{n_1^T K^{-1} \bar{x}_{1,2}}$$

$$X_{3,4} = X_{1,2} + Z_{curb} n_1$$

$$\bar{x}_{3,4} = K X_{3,4}$$

In these equations, x may be used to denote the three-dimensional homogenous image coordinates of the corresponding two-dimensional image point x.

The above equations may be used to determine the homographies H1, H2, and H3 using the image warp function $\tilde{W}$ (x; y; p). Since the curb height $Z_{curb}$ for step function 1100 is an unknown parameter, the image warp function $\tilde{W}$ (x; y; p) may be iteratively solved until an appropriate $Z_{curb}$ is determined. The appropriate $Z_{curb}$ may correspond to a result of the image warp equation $\tilde{W}$ (x; y; p) that is within a satisfactory error when warping the coordinates of the region of interest 1120 between captured image frames. This may be determined using the error minimization function E(p), where E(p) is defined as:

$$E(p) = \sum_{(x,y) \in C \setminus M} \left[Ib([x, y]T) - Ia(\vec{W}(x, y; p))\right]^2$$

The error minimization function E(p) may be used to minimize a difference between a current frame and the warp of a previous frame using known information, assumptions, and or estimated information. For example, system 100 may use the brightness constancy assumption when using the error minimization function E(p). The error minimization function E(p) allows one captured image frame to be compared to another captured image frame by warping the coordinates of one frame to the coordinates of the other frame. Minimizing the error of the warp allows system 100 to provide a more accurate calculation of $Z_{curb}$ (e.g., because a low error value may indicate that the difference between captured image frame is accurately considered).

For each curb edge line candidate, system 100 may use the image warp function $\tilde{W}$ (x; y; p) to identify the parameter vector p. The parameter vector p includes at least $Z_{curb}$, depending on whether other parameters are known, assumed, or estimated (e.g., additional degrees of freedom may be built in to allow some parameters to be unknown). Based on the parameter vector p, system 100 may determine a curb height $Z_{curb}$ that is within an error threshold determined based on the error minimization function E(p). This $Z_{curb}$ value may represent a value of a height of a step function modeled to a given curb edge line candidate.

System 100 may compare the calculated $Z_{curb}$ value to an expected $Z_{curb}$ value (e.g., an average height of a curb that may be expected to be found on the road) to determine whether the calculated $Z_{curb}$ value is within a threshold difference. If the calculated $Z_{curb}$ value is within the threshold difference, system 100 may determine that the curb edge line candidate corresponds to a curb edge line.

System 100 may repeat the process of using the CAA (which may include the equations described above) to determine whether one or more identified curb edge line candidate corresponds to an curb edge line. System 100 may model each curb edge line candidate as both a curb bottom edge and a curb top edge to determine whether the curb edge line candidate matches either edge of a curb. Based on these processes, system 100 may determine the location of one or more curbs within an image or video sequence of images.

After a curb has been identified, pedestrian identification module 830 may perform one or more processes to identify a pedestrian relative to the curb. For example, pedestrian identification module 830 may assess whether an identified pedestrian is a potential hazard. System 100 may use the information related to the curb and the pedestrians to provide warnings to a driver and/or control the vehicle as it travels on the road.

Figure 12:
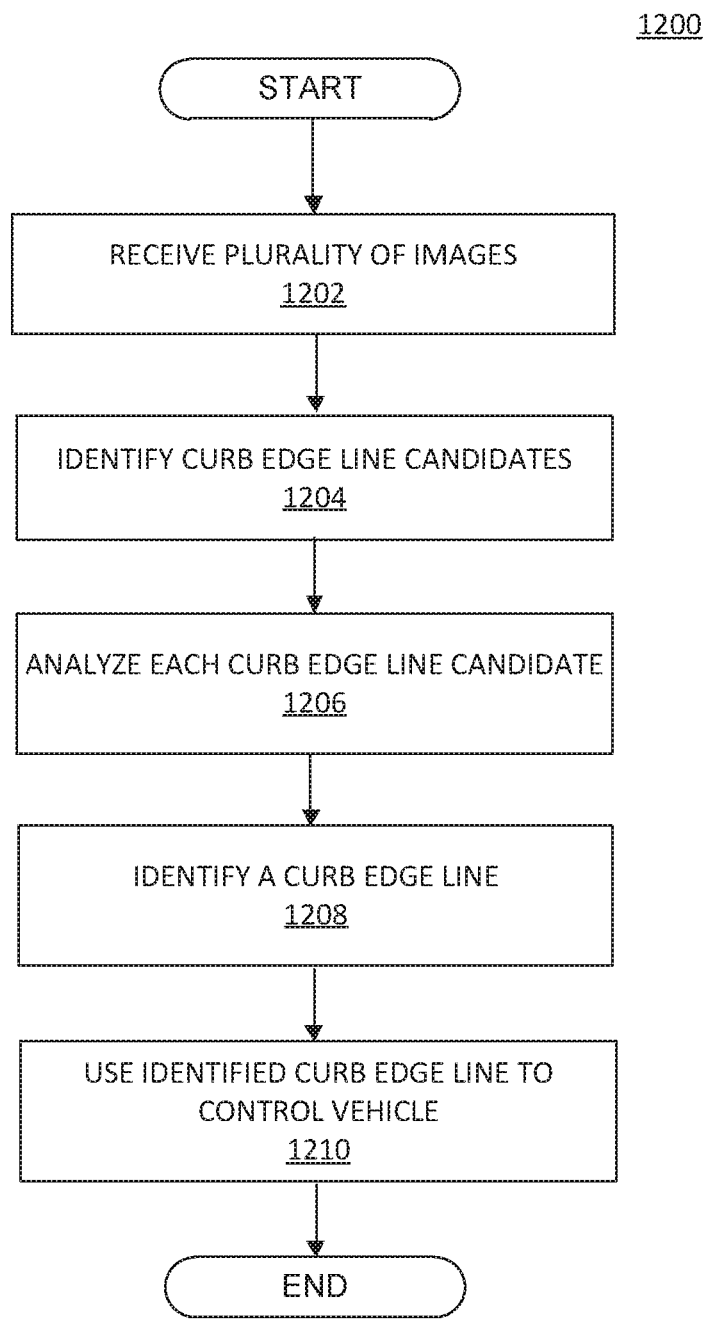
FIG. 12 is a flowchart of an exemplary process for identifying a curb within an image or video sequence consistent with disclosed embodiments.

FIG. 12 is a flowchart showing an exemplary process 1200 for identifying a curb within an image and/or video sequence. In an exemplary embodiment, system 100 may perform process 1200 to determine the location of a curb such that system 100 may determine a boundary of a road surface. Knowledge of the boundary of the road surface may allow system 100 to promote safe operation of a vehicle, through helping to maintain the vehicle on the road surface and out of collisions with objects and/or pedestrians. Further, knowledge of the boundary of the road surface may allow system 100 to assess whether any pedestrians or other objects are on the road surface and therefor hazards for which some action to prevent a collision should be taken.

In step 1202, processing unit 110 may receive a plurality of images of a vehicle environment. For example, one or more of image capture devices 122, 124, 126 may acquire a plurality of images of an area forward of vehicle 200. The area forward of the vehicle may include various features, such as those depicted in FIG. 9.

In step 1204, processing unit 110 may identify curb edge line candidates. For example, processing unit 110 (e.g., curb identification module 810) may use an algorithm or equation to identify linear edges within a capture images. These linear edges may represent curb edge candidates that may be further processed to determine whether they correctly represent edges of an curb present in the image or video sequence. In one example, processing unit 110 may use an edge detection method, such as using the Hough transform or by fitting lines to long connected components of the Canny edge response, to identify curb edge line candidates.

In step 1206, processing unit 110 may analyze each curb edge line candidate. For example, processing unit 110 (e.g., curb registration module 820) may use an algorithm or equation to iteratively process curb edge line candidates to determine whether any of them correspond to a curb edge line. For example, processing unit may use the CAA to model each curb edge line candidate as a step function and determine whether a corresponding height of that step function corresponds to what would be expected of a real curb.

In step 1208, processing unit 110 may identify at least one of the curb edge line candidates as an edge line of a curb. For example, processing unit 110 (e.g., curb registration module 820) may select a curb edge line candidate that is determined to be an edge line of a curb and store or otherwise identify that edge line candidate as a curb edge line. The curb edge line may be identified as a curb top edge or a curb bottom edge.

In addition, processing unit 110 may identify regions that correspond to the road surface and the off-road surface based on the identified edge line of the curb. For example, processing unit 110 may use determined edge lines of the curb to identify the curb throughout an image and/or video sequence and may identify a first region as a road surface and a second region as an off-road surface, throughout the image and/or each image of a video sequence. In this way, processing unit 110 may identify a physical boundary of a road on which vehicle 200 travels. In some embodiments, processing unit 110 may store location and/or coordinate information associated with the identified curb edge line or curb.

In step 1210, processing unit 110 may use the identified curb edge line or curb to control vehicle 200. For example, processing unit 110 may provide location and/or coordinate information to a vehicle control module that makes decisions regarding speed, direction, acceleration, etc., of vehicle 200. In some instances, processing unit 110 may use the modeled curb to assess whether there are hazards that need to be considered. For example, processing unit 110 may use a modeled curb to assess pedestrian hazards, as explained in more detail below.

Figure 13:
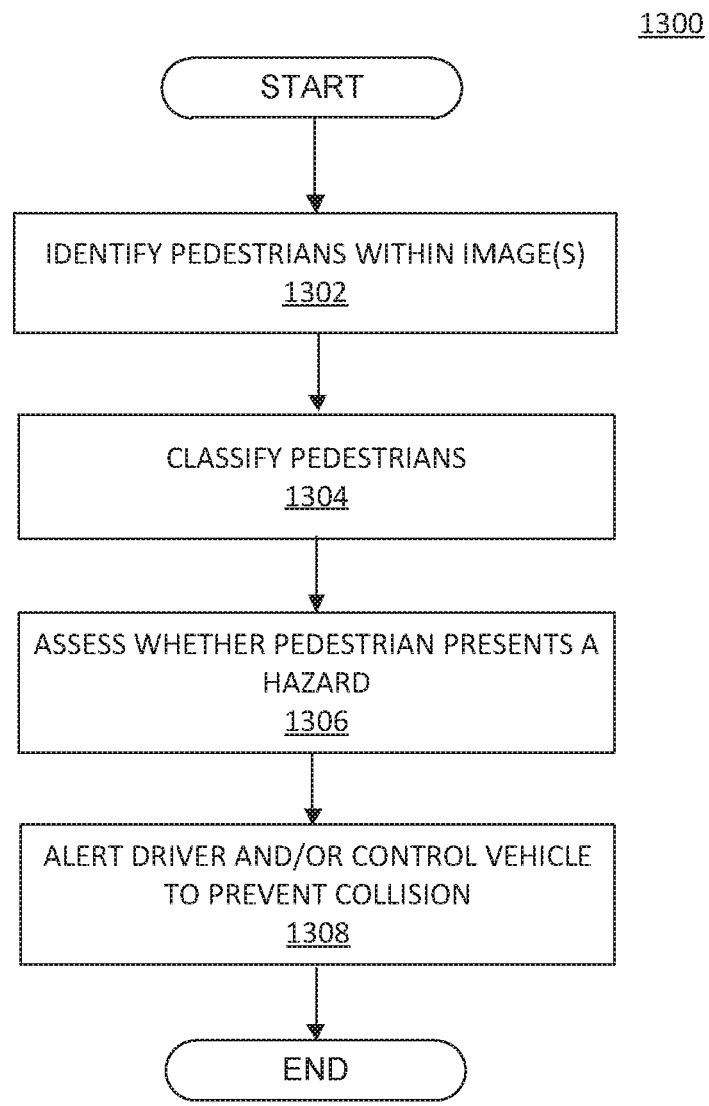
FIG. 13 is a flowchart of an exemplary process for assessing hazards presented by pedestrians consistent with disclosed embodiments.

FIG. 13 is a flowchart showing an exemplary process 1300 for assessing hazards presented by pedestrians or other objects that may be located within a roadway. In an exemplary embodiment, system 100 may perform process 1300 to determine the location on one or more pedestrians in a FOV of an image capturing device 122, 124, 126. For example, system 100 may determine that one or more pedestrians is located on a road surface of a road (e.g., and therefore not off-road) and determine one or more actions that should be taken to prevent a collision with the pedestrian.

In step 1310, processing unit 110 may identify pedestrians within an image and/or images of a video sequence. For example, processing unit 110 (e.g., pedestrian identification module 830) may process one or more images to identify objects of interest within the images. Processing unit 110 may further analyze the objects of interest to determine whether they correspond to a pedestrian (or other object which may be treated as a pedestrian, such as an animal, bicyclist, etc.). In one example, processing unit may compare an image to stored images to match characteristics of an image with information that is known to correspond to a pedestrian (e.g., a figure in the shape of a person). In another example, processing unit may compare multiple images of a video sequence to identify objects that are moving in a manner consistent with a pedestrian.

In step 1320, processing unit 110 may classify pedestrians. For example, processing unit 110 (e.g., pedestrian identification module 830) may classify pedestrians as either on the road surface or on the off-road surface. In one example, processing unit 110 may compare the location and/or trajectory of an identified pedestrian with the location of an identified and modeled curb (e.g., a curb modeled using process 1200). For instance, processing unit may determine whether the pedestrian is within a region that is determined to be the road surface (e.g., inside of a bottom edge of the curb) or within a region that is determined to be the off-road surface (e.g., outside of a top edge of the curb).

In step 1330, processing unit 110 may assess whether a pedestrian presents a hazard to vehicle 200. In one example, processing unit 110 may determine that a pedestrian on the road surface is a hazard. In another example, processing unit 110 may compare a trajectory of vehicle 200 to a trajectory of an identified pedestrian on the road surface to determine whether there is a possibility of a collision between vehicle and the pedestrian.

In step 1340, processing unit 110 may alert a driver and/or control vehicle 200 to prevent a collision. In one example, processing unit 110 may alert a driver to a pedestrian on a road surface whenever a pedestrian is classified as being on the road surface. In another example, processing unit 110 may alert a driver only if processing unit 110 determines that a collision with the pedestrian is likely (e.g., above a risk threshold, such as based on a predicted closest distance between vehicle 200 and the pedestrian at some point in time). In some embodiments, processing unit 110 may use the assessment of a pedestrian hazard to automatically control travel of vehicle 200. For example, processing unit 110 may modify a path (e.g., steering direction), speed, acceleration, etc., of vehicle 200 in order to avoid a collision with a pedestrian.

System 100 may use processes 1200 and/or 1300 to identify features of an environment of vehicle 200, and use those features to operate/control vehicle 200. In particular, as discussed in the examples above, system 100 may identify a road boundary and determine whether there are any pedestrian hazards based on their location with respect to the road boundary. It should be understood, however, that these are examples, and that other similar processes may be implemented. For example, other road boundaries besides curbs, such as railings, medians, shoulders, etc., may be determined, and other hazards besides pedestrians, such as other vehicles, debris, road imperfections, etc., may be identified and assessed based on their location and/or position with respect to a road boundary.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A component of a detection system, comprising:
   at least one processor; and
   a non-transitory computer-readable storage medium including instructions that, when executed by the at least one processor, cause the at least one processor to:
      receive a plurality of images of an area output from at least one camera;
      determine a plurality of road edge candidates from the plurality of images of the area; and
      differentiate, based on the road edge candidates, between surfaces on the road and those off-road or alongside the road.

2. The component of claim 1, wherein the plurality of road edge candidates comprises curb candidates.

3. The component of claim 1, wherein the determining the plurality of road edge candidates comprises using a structure from motion technique.

4. The component of claim 1, wherein the at least one processor is further caused to:
   identify a pedestrian in one or more of the plurality of images; and
   assess whether the pedestrian is on the road surface or off-road or alongside the road surface.

5. The component of claim 4, wherein the identifying a pedestrian comprises using a structure from motion technique.

6. The component of claim 4, wherein the identifying a pedestrian comprises using optical flow technique.

7. The component of claim 1, wherein the determining the plurality of road edge candidates comprises using an optical flow technique.

8. The component of claim 1, wherein the at least one processor is further caused to:
   identify an object in one or more of the plurality of images;
   assess whether the object presents a hazard; and
   determine an action to be taken to avoid a collision with the object, based on the assessment.

9. A component of a detection system, comprising:
   a processing means for:
      receiving a plurality of images of an area output from at least one camera;
      determining a plurality of road edge candidates from the plurality of images of the area; and
      differentiating, based on the road edge candidates, between surfaces on the road and those off-road or alongside the road.

10. The component of claim 9, wherein the plurality of road edge candidates comprises curb candidates.

11. The component of claim 9, wherein the determining the plurality of road edge candidates comprises using a structure from motion technique.

12. The component of claim 9, wherein the processing means is further for:
   identifying a pedestrian in one or more of the plurality of images; and assessing whether the pedestrian is on the road surface or off-road or alongside the road surface.

13. The component of claim 12, wherein the identifying a pedestrian comprises using a structure from motion technique.

14. The component of claim 12, wherein the identifying a pedestrian comprises using a structure from optical flow technique.

15. The component of claim 9, wherein the determining the plurality of road edge candidates comprises using an optical flow technique.

16. The component of claim 9, wherein the processing means is further for:
 identifying an object in one or more of the plurality of images;
 assessing whether the object presents a hazard; and
 determining an action to be taken to avoid a collision with the object, based on the assessment.

17. A camera of a detection system, comprising:
 a component including:
  at least one processor; and
  a non-transitory computer-readable storage medium including instructions that, when executed by the at least one processor, cause the at least one processor to:
   receive a plurality of images of an area output from at least one camera;
   determine a plurality of road edge candidates from the plurality of images of the area; and
   differentiate, based on the road edge candidates, between surfaces on the road and those off-road or alongside the road.

18. The camera of claim 17, wherein the plurality of road edge candidates comprises curb candidates.

19. The camera of claim 17, wherein the determining the plurality of road edge candidates comprises using a structure from motion technique.

20. The camera of claim 17, wherein the at least one processor is further caused to:
 identify a pedestrian in one or more of the plurality of images; and
 assess whether the pedestrian is on the road surface or off-road or alongside the road surface.

21. The component of claim 20, wherein the identifying a pedestrian comprises using a structure from motion technique.

22. The camera of claim 20, wherein the identifying a pedestrian comprises using optical flow technique.

23. The component of claim 17, wherein the determining the plurality of road edge candidates comprises using an optical flow technique.

24. The camera of claim 17, wherein the at least one processor is further caused to:
 identify an object in one or more of the plurality of images;
 assess whether the object presents a hazard; and
 determine an action to be taken to avoid a collision with the object, based on the assessment.

* * * * *